(12) United States Patent
Singhal et al.

(10) Patent No.: US 7,085,830 B1
(45) Date of Patent: Aug. 1, 2006

(54) SYSTEM AND METHOD TO MANAGE INCONSISTENCY PROBLEMS BETWEEN NETWORK MANAGEMENT SYSTEMS AND NETWORK ELEMENTS

(75) Inventors: Naresh C. Singhal, Union City, CA (US); Bahar E. Baran, Foster City, CA (US)

(73) Assignee: Network Equipment Technologies, Inc., Fremont, CA (US)

( * ) Notice: Subject to any disclaimer, the term of this patent is extended or adjusted under 35 U.S.C. 154(b) by 747 days.

(21) Appl. No.: 10/041,783

(22) Filed: Oct. 18, 2001

(51) Int. Cl.
*G06F 15/173* (2006.01)
*G06F 17/00* (2006.01)

(52) U.S. Cl. .................... 709/223; 709/221; 707/102; 707/200

(58) Field of Classification Search ............. 709/220, 709/221, 224, 223, 226; 707/102, 200
See application file for complete search history.

(56) References Cited

U.S. PATENT DOCUMENTS

| | | |
|---|---|---|
| 5,513,343 A | 4/1996 | Sakano et al. |
| 5,522,044 A | 5/1996 | Pascucci et al. |
| 5,666,486 A | 9/1997 | Alfieri et al. |
| 5,706,509 A | 1/1998 | Man-Hak Tso |
| 5,734,642 A | 3/1998 | Vaishnavi et al. |
| 5,761,502 A | 6/1998 | Jacobs |
| 5,768,522 A | 6/1998 | Nicolas |
| 5,848,243 A | 12/1998 | Kulkarni et al. |
| 5,889,953 A * | 3/1999 | Thebaut et al. ............ 709/221 |
| 6,052,722 A | 4/2000 | Taghadoss |
| 6,115,382 A | 9/2000 | Abe |
| 6,122,639 A | 9/2000 | Babu et al. |
| 6,125,369 A | 9/2000 | Wu et al. |
| 6,125,390 A | 9/2000 | Touboul |
| 6,128,656 A | 10/2000 | Matchefts et al. |
| 6,223,219 B1 * | 4/2001 | Uniacke et al. ............ 709/223 |
| 6,243,747 B1 * | 6/2001 | Lewis et al. ................ 709/220 |
| 6,301,613 B1 * | 10/2001 | Ahlstrom et al. ........... 709/223 |
| 6,327,618 B1 * | 12/2001 | Ahlstrom et al. ........... 709/223 |
| 6,330,600 B1 * | 12/2001 | Matchefts et al. .......... 709/223 |
| 6,374,293 B1 * | 4/2002 | Dev et al. ................... 709/220 |
| 2003/0041238 A1 * | 2/2003 | French et al. ............... 713/153 |

* cited by examiner

*Primary Examiner*—Saleh Najjah
*Assistant Examiner*—David Lazaro
(74) *Attorney, Agent, or Firm*—Townsend and Townsend and Crew LLP

(57) ABSTRACT

A system and method are provided for managing configuration inconsistencies between a network management system (NMS) and network elements (NEs). In one example, the system includes a user interface, which includes an object field configured to identify database objects of the network management system, wherein each database object corresponds to a network element; a network device field configured to identify a top level network device that contains the network element; a status field configured to display a database object state, wherein the database object state represents a relationship between the database object configuration and the network element configuration; and an input mechanism configured to issue a command to edit one of network element values and database object values.

23 Claims, 2 Drawing Sheets

SYSTEM AND METHOD TO MANAGE INCONSISTENCY PROBLEMS BETWEEN NETWORK MANAGEMENT SYSTEMS AND NETWORK ELEMENTS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present application is related to U.S. patent application Ser. No. 10/045,182, entitled "METHOD FOR SYNCHRONIZING CIRCUIT RELATED OBJECTS BETWEEN NETWORK MANAGEMENT SYSTEMS AND NETWORK CONTROL PROCESSORS", filed Oct. 18, 2001, the disclosure of which are herein incorporated by reference.

FIELD OF THE INVENTION

The present invention generally relates to managing state attributes in a network and, more particular, to inconsistency problems between network management systems and network elements.

DISCUSSION OF BACKGROUND

Network management system (NMS) designers have always had to deal with the problem of defining which entity is the master—the NMS database, or the network element (NE). Typically, the NMS stores the NE configuration in its own database in one of two ways. First, while creating an NE through the NMS, the NMS is given a set of configuration parameters with which the NE is created. So, one can assume that the NE and the NMS database are consistent (i.e., in sync) as far as the NE is concerned.

Second, some NMS systems have the capacity to upload or resync the NE configuration into the NMS database. In such a case too, the NMS database can be assumed to be in sync with the NE configuration.0

However, the NMS database can become inconsistent (or go out of sync) with the network configuration in two ways. In one way, changes on the network side occur. Operators of the network have a line operator interface (LOI) available in order to change the NE configuration, to delete the NE, or to create new NEs. Another way the NMS database can become inconsistent is that changes on the NMS side can occur. The operators can physically remove or install new equipment into the network, thereby deleting or creating new NEs. The NMS administrators can intentionally or unintentionally change the NMS database configuration for some or all NEs.

Unfortunately, at any given time, it is difficult to determine whether the NMS configuration is in sync with an NE or not.

SUMMARY OF THE INVENTION

It has been recognized that what is needed is a way to manage changes to network configurations in a conscious manner by a person like a system or network administrator. Broadly speaking, the present invention fills this need by providing a system that allows an administrator to make changes easily to network configurations in order to ensure consistency in a network.

In one embodiment, a system is provided for managing configuration inconsistencies between a network management system (NMS) and network elements (NEs). The system comprises a user-interface that includes an object field configured to identify database objects of the network management system, wherein each database object corresponds to a network element; a network device field configured to identify a top level network device that contains the network element; a status field configured to display a database object state, wherein the database object state represents a relationship between the database object configuration and the network element configuration; and an input mechanism configured to issue a command to edit one of network element values and database object values.

In another embodiment, a method is provided for managing attribute inconsistencies between a network management system (NMS) and a network element (NE). The method comprises providing an object field in a user interface to identify database objects of the network management system, wherein each database object corresponds to a network element; providing a network device field configured to identify a top level network device that contains the network element; providing a status field configured to display a database object state, wherein the database object state represents a relationship between the database object configuration and the network element configuration; and issuing a command to edit one of network element values and database object values.

Advantageously, the present invention deals with problems in which configurations change on the network/device side or the database (NMS) side, and when the two are resynchronized, neither is updated automatically to match the other one. No matter where the changes happened, the present invention gives an administrator a way of knowing where the change happened, and then accepting or taking the change back on either the network or the NMS side. The present invention gives more control to administrators over things that are happening in the network/device and in the NMS database. The present invention also provides other management capabilities, such as the ability to make changes in the NMS first and getting the changes done on the network some time later, for example, when the rest of the network is ready.

The invention encompasses other embodiments of a method, an apparatus, and a computer-readable medium, which are configured as set forth above and with other features and alternatives.

BRIEF DESCRIPTION OF THE DRAWINGS

The present invention will be readily understood by the following detailed description in conjunction with the accompanying drawings. To facilitate this description, like reference numerals designate like structural elements.

DESCRIPTION OF THE PREFERRED EMBODIMENTS

An invention is disclosed for a system and method for managing configuration inconsistencies between a network management system (NMS) and network elements (NEs). Numerous specific details are set forth in order to provide a thorough understanding of the present invention. It will be understood, however, to one skilled in the art, that the present invention may be practiced without some or all of these specific details.

In the present invention, a new state attribute is provided to assist a network administrator in managing the consistency between a network management system (NMS) and network elements (NEs). This attribute may have one of several values, including "normal," "network device," "NMS," and "conflict." However, the present invention is not limited to these specific names. For example, "NMS" may also be referred to as "local." As another example, "network device" may more specifically be referred to as "switch," "node," "router," "bridge," or "multiplexer," among other things.

Corresponding to each NE, a database object exists in the NMS. Each of the database objects will have an attribute, referred to as "LifeCycleState," with one of the aforementioned four values.

Figure 1:
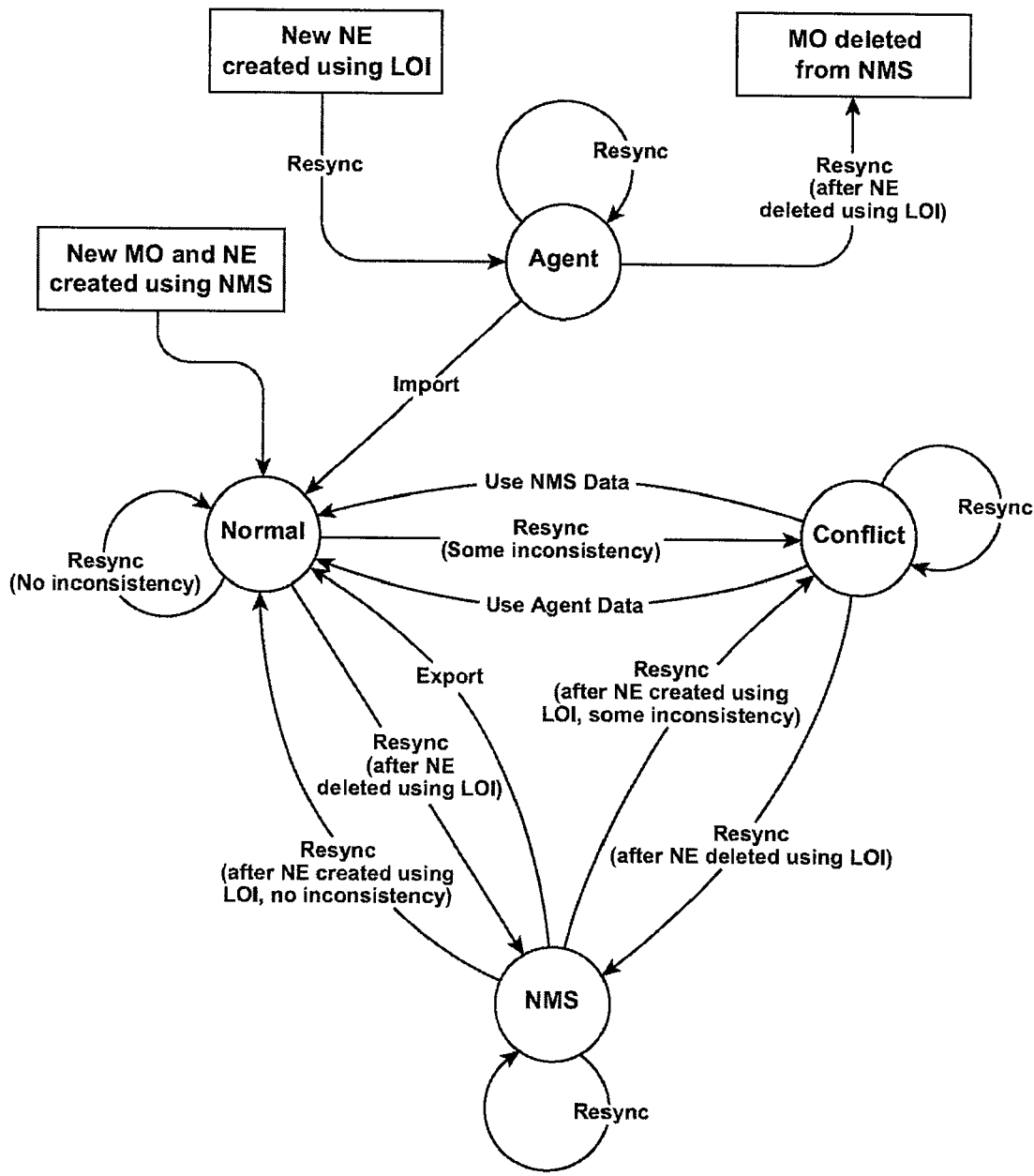
FIG. 1 is a state diagram showing a way an NMS database object goes from one LifeCycleState to another, in accordance with one embodiment of the present invention.

FIG. 1 is a state diagram showing a way an NMS database object goes from one LifeCycleState to another, in accordance with one embodiment of the present invention. A LifeCycleState having a "normal" value means that both the database object and the network element have exactly the same configuration.

A LifeCycleState having a "conflict" value means that some inconsistency exists between the database object configuration and the network element configuration. Such an inconsistency could have been caused by changes to configurations using a line operator interface (LOI). In a conflict state, the user (e.g., network administrator) may perform either a "Use Agent Data" (i.e., "Use Switch") or a "Use NMS Data" (i.e., "Use Local") operation. The "Use Agent Data" operation gets the configuration values from the NE (i.e., the agent) and sets them on the corresponding database object. The "Use NMS Data" operation gets the configuration values from the database object and sets them on the corresponding NE.

A LifeCycleState having an "NMS" (i.e., "local" or "local only") value means that no corresponding NE exists for the selected database object. An "Export" operation would create a corresponding NE having same configuration values as the database object.

A LifeCycleState having an "agent" (i.e., "switch" or "switch only") value means that there is an NE, but that corresponding database object does not exists. An "Import" command would create the database object and set the LifeCycleState to a Normal value.

The method of FIG. 1 gives a user a more complete picture of how updated or how in-sync the NMS database is with respect to the network. The method also gives a user more elaborate controls on how to resolve conflicts, if any. The method, by default allows a user to set either the NMS or a selected network device as the master. Alternatively, the method can be customized to allow only the NMS or the network device as master.

Figure 2:
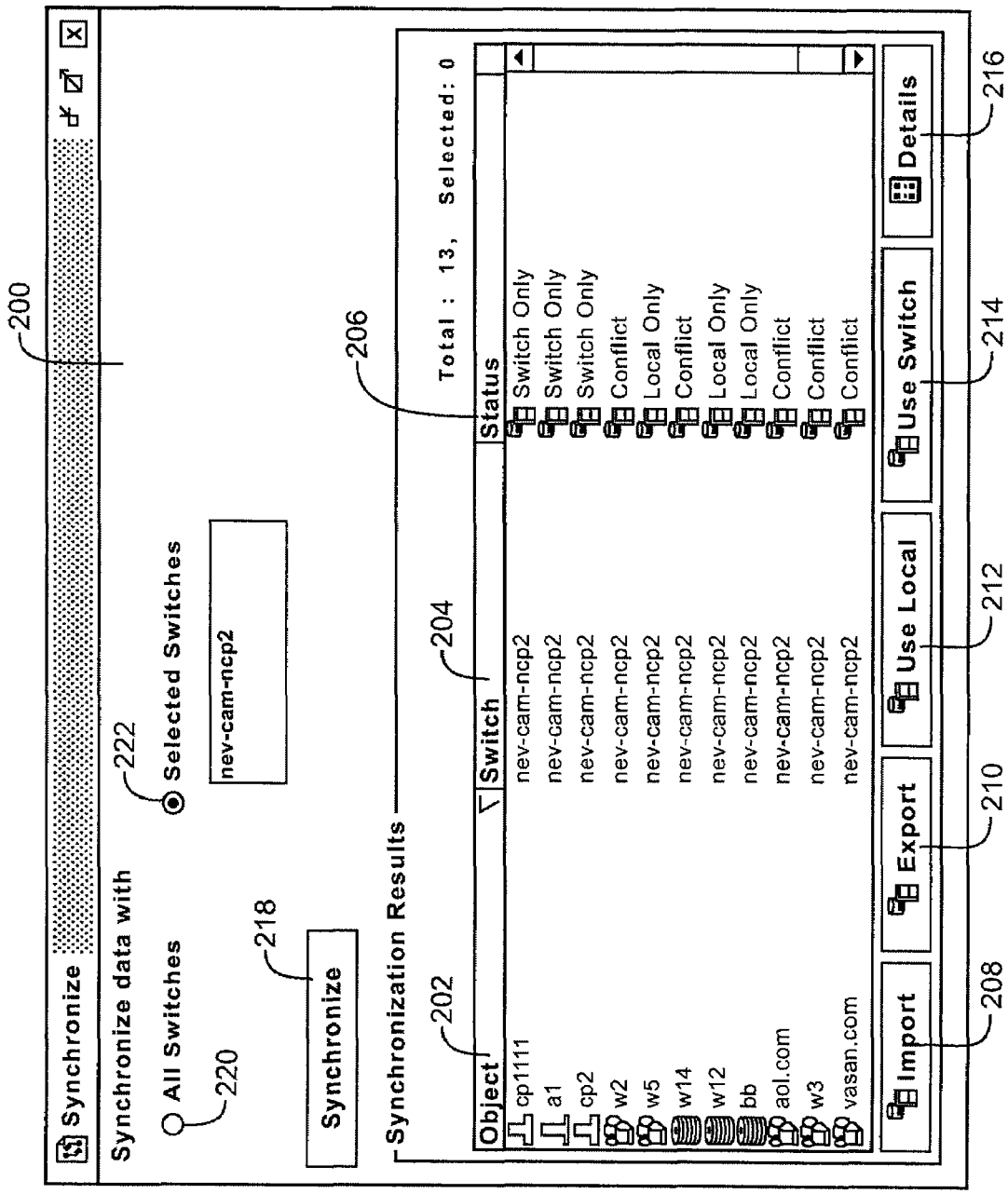
FIG. 2 is an example of a user interface for a system for managing inconsistencies between an NMS and NEs, in accordance with one embodiment of the present invention.

FIG. 2 is an example of a user interface 200 for a system for managing inconsistencies between an NMS and NEs, in accordance with one embodiment of the present invention. The user interface 200 includes an object field 202, a switch field 204, and a status field 206. Note that a switch is just one example of a network device. Thus, the switch field 204 can otherwise be referred to as "network device" field, or another appropriately identifying name, such as node, router, bridge, multiplexer, etc.

Information in the object field 202 identifies database objects of the NMS. Each database object corresponds to a network element. Information in the switch field 204 identifies the top level network device of which the network element is a part. Information in the status field indicates the state of the database object in the same row. The network element corresponding to a particular database object is logically a child of the top level switch. That is, a network element is a part of, or contained within, a switch. Note, again, that the present embodiment does not limit the invention to these specific names. For example, the switch field may more broadly be referred to as the "network device" field.

The user interface 200 also includes input mechanisms, including a Use Local button 212, a Use Switch button 214, an Import button 208, an Export button 210, and a Details button 216. These buttons correspond to operations discussed above with reference to FIG. 1. The settings established by the buttons would occur at the next resynchronization, which may be activated by the Synchronize button 218. Resynchronization is an NMS side operation, during which the network configuration and the NMS database configuration are compared for all (or selected) objects, and the database objects are updated with their new state information, if changed.

The user interface 200 also includes an All Switches radio button 220 and a Selected Switches radio button 222. The All Switches radio button 220 allows a user to resynchronize all of the top level network devices (e.g., switches) manageable by the present system. The Selected Switches radio button 222 allows a user to resynchronize only selected top level network devices (e.g., switches) manageable by the present system.

System and Method Implementation

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, CD-ROMS, micro-drive, and magneto-optical disks, ROMs, RAMs, EPROMS, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, providing an object field in a user interface to identify database objects of the network management system, providing an network device field configured to identify the network element, providing a status field configured to display a database object state, and issuing a command to edit one of network element values and database object values, according to processes of the present invention.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A system for managing configuration inconsistencies between a network management system (NMS) and network elements (NEs), the system comprising:
   a user-interface including:
   an object field configured to identify database objects of the network management system, wherein each database object corresponds to a network element;
   a status field configured to display a database object state, wherein the database object state represents a relationship between a database object configuration and a network element configuration, wherein if an inconsistency is found between the database object configuration and the network element configuration, the inconsistency is shown as one of a plurality of configuration inconsistency types, the plurality of configuration inconsistency types including:
   a first inconsistency type, meaning an inconsistency exists between the database object configuration and the network element configuration;
   a second inconsistency type, meaning no network element exists for a selected database object; and
   a third inconsistency type, meaning that a network element exists, but that no corresponding database object exists;
   one or more selectable input mechanisms, each input mechanism performing a different action, wherein the inconsistency type shown is used to determine an input mechanism that, when selected by the user, performs an action that automatically resolves the inconsistency by editing the database object configuration and/or the network element configuration.

2. The system of claim 1, wherein network element values define the configuration of the network element, and
   wherein database object values define the configuration of the database object.

3. The system of claim 1, wherein a state of the database object is:
   normal, meaning both the database object and the network element have exactly the same configuration.

4. The system of claim 2, wherein the inconsistency type is the first inconsistency type, and the input mechanism is configured to issue a command to have the network element acquire the database object values.

5. The system of claim 2, wherein the inconsistency type is the first inconsistency type and the input mechanism is configured to issue a command to have the database object acquire the network element values.

6. The system of claim 2, wherein the state of the inconsistency type is the second inconsistency type, and the input mechanism is configured to issue a command to create a network element having the database object values.

7. The system of claim 2, wherein the state of the inconsistency type is the third inconsistency type, and the input mechanism is configured to issue a command to create a database object having the network element values.

8. A method for managing attribute inconsistencies between a network management system (NMS) and a network element (NE), the method comprising:
   providing an object field in a user interface to identify database objects of the network management system, wherein each database object corresponds to a network element;
   providing a status field configured to display a database object state, wherein the database object state represents a relationship between a database object configuration and a network element configuration;
   if an inconsistency is found between the database object configuration and the network element configuration, displaying the inconsistency as one of a plurality of configuration inconsistency types, the plurality of configuration inconsistency types including:
   a first inconsistency type, meaning an inconsistency exists between the database object configuration and the network element configuration;
   a second inconsistency type, meaning no network element exists for a selected database object; and
   a third inconsistency type, meaning that a network element exists, but that no corresponding database object exists;
   receiving a selection of one or more input mechanisms, wherein each input mechanism performing a different action, wherein the inconsistency type shown is used to determine an input mechanism that performs an action that automatically resolves the inconsistency by editing the database object configuration and/or the network element configuration.

9. The method of claim 8, wherein network element values define the configuration of the network element, and wherein database object values define the configuration of the database object.

10. The method of claim 8, further comprising providing in the object field a state of the database object as being:
    normal, meaning both the database object and the network element have exactly the same configuration.

11. The method of claim 9, wherein the inconsistency type is the first inconsistency type, the method further comprising receiving a selection of an input mechanism to issue a command to have the network element acquire the database object values.

12. The method of claim 9, wherein the inconsistency type is the first inconsistency type, the method further comprising receiving a selection of an input mechanism to issue a command to have the database object acquire the network element values.

13. The method of claim 9, wherein the state of the inconsistency type is the second inconsistency type, the method further comprising receiving a selection of an input mechanism to issue a command to create a network element having the database object values.

14. The method of claim 9, wherein the state of the inconsistency type is the third inconsistency type, the method further comprising receiving a selection of an input mechanism to issue a command to create a database object having the network element values.

15. The method of claim 8, further comprising:
resynchronizing the network management system and the network element; and
carrying out the command to edit one of the network element values and the database object values.

16. A computer-readable medium carrying one or more sequences of one or more instructions for managing attribute inconsistencies between a network management system (NMS) and a network element (NE), the one or more sequences of one or more instructions including instructions which, when executed by one or more processors, cause the one or more processors to perform the steps of:
providing an object field in a user interface to identify database objects of the network management system, wherein each database object corresponds to a network element;
providing an agent field configured to identify the network element;
providing a status field configured to display a database object state, wherein the database object state represents a relationship between a database object configuration and a network element configuration;
if an inconsistency is found between the database object configuration and the network element configuration, displaying the inconsistency as one of a plurality of configuration inconsistency types, the plurality of configuration inconsistency types including:
a first inconsistency type, meaning an inconsistency exists between the database object configuration and the network element configuration;
a second inconsistency type, meaning no network element exists for a selected database object; and
a third inconsistency type, meaning that a network element exists, but that no corresponding database object exists;
receiving a selection of one or more input mechanisms, wherein each input mechanism performing a different action, wherein the inconsistency type shown is used to determine an input mechanism that performs an action that automatically resolves the inconsistency by editing the database object configuration and/or the network element configuration.

17. The computer-readable medium of claim 16, wherein network element values define the configuration of the network element, and wherein the database object values define the configuration of the database object.

18. The computer-readable medium of claim 16, wherein the instructions further cause the processor to carry out the step of providing in the object field a state of the database object as being:
normal, meaning both the database object and the network element have exactly the same configuration.

19. The computer-readable medium of claim 17, wherein the inconsistency type is the first inconsistency type, and wherein the instructions further cause the processor to issue a command to have the network element acquire the database object values.

20. The computer-readable medium of claim 17, wherein the inconsistency type is the first inconsistency type, and wherein the instructions further cause the processor to issue a command to have the database object acquire the network element values.

21. The computer-readable medium of claim 17, wherein the inconsistency type is the second inconsistency type, and wherein the instructions further cause the processor to issue a command to create a network element having the database object values.

22. The computer-readable medium of claim 17, wherein the inconsistency type is the third inconsistency type, and wherein the instructions farther cause the processor to issue a command to create a database object having the network element values.

23. The computer-readable medium of claim 16, wherein the instructions further cause the processor to carry out the steps of:
resyncing the network management system and the network element; and carrying out the command to edit one of the network element values and the database object values.

* * * * *